United States Patent [19]

Devlin et al.

[11] 3,846,739

[45] Nov. 5, 1974

[54] TWO-OUT-OF-THREE LOGIC TERMINAL BOARD

[75] Inventors: Charles L. Devlin, Ballston Lake; Markus A. Eggenberger, Schenectady, both of N.Y.

[73] Assignee: General Electric Company, Schenectady, N.Y.

[22] Filed: June 20, 1973

[21] Appl. No.: 371,824

[52] U.S. Cl. .................. 339/198 V, 339/18, 339/19, 317/118

[51] Int. Cl. .................. H01r 9/00

[58] Field of Search ...... 339/18, 19, 198, 222, 22 B, 339/174, 242; 317/118

[56] References Cited

UNITED STATES PATENTS

| | | | |
|---|---|---|---|
| 2,671,888 | 3/1954 | Hadden et al. | 339/198 V |
| 3,002,177 | 9/1961 | Bundy | 339/198 V |
| 3,496,516 | 2/1970 | McFadden | 339/18 |
| 3,512,121 | 5/1970 | Bergeron | 339/198 E |
| 3,609,634 | 9/1971 | Hovnanian et al. | 339/19 |
| 3,728,656 | 4/1973 | Neuber | 339/222 |

*Primary Examiner*—James T. McCall
*Assistant Examiner*—Robert A. Hafer
*Attorney, Agent, or Firm*—John F. Ahern; James W. Mitchell

[57] ABSTRACT

A terminal board for connecting a plurality of actuatable devices into a two-out-of-three logic arrangement. The terminal board is formed of an insulative base with a plurality of conductors disposed in a corresponding plurality of parallel channels formed in the base. Interconnecting strips are arranged transversely to the channels and connect the conductors in a predetermined arrangement. The terminal board is divided into three sections wherein each section comprises a grouping of terminals to be connected to a pair of actuatable devices actuated by a single sensor and each section has a separate cover.

5 Claims, 4 Drawing Figures

PATENTED NOV 5 1974 3,846,739

TWO-OUT-OF-THREE LOGIC TERMINAL BOARD

BACKGROUND OF THE INVENTION

This invention relates to terminal boards and, more particularly, to logic function terminal boards for connecting a plurality of actuated devices into a two-out-of-three logic arrangement.

Many monitoring systems require near absolute operational reliability, and to assure a high level of operational reliability, redundant monitoring features are incorporated in the systems. Conventionally, a redundant monitoring system employs monitoring devices or sensors which actuate plural contact closures, and the contact closures are arranged in a manner such that the monitoring system is activated when two out of three of the monitoring devices or sensors have actuated their respective contact closures. Such a two-out-of-three logic arrangement is described in pending application Ser. No. 177,309, filed Sept. 2, 1971 now U.S. Pat. No. 3,748,540 and assigned to the assignee of the present invention. The two-out-of-three logic system insures a high level of operational reliability by substantially reducing the likelihood of undesired monitoring system activation due to a defect in a monitoring device or sensor.

Conventional practice in connecting the contact closures in a two-out-of-three logic function arrangement has been to hard wire the contact closures, that is, each particular contact closure is interconnected by a single conductor to at least one other contact closure. Generally, this procedure is accomplished by individuals and is therefore subject to human error, particularly when a complex two-out-of-three logic function arrangement employs a large number of contact closures which must be interconnected by a large number of conductors. Furthermore, the hard wiring practice creates possibilites that improper contact closures will be shorted out or connected in a manner which could result in damage to the monitoring devices or sensors connected to the contact closures. Additionally, mistakes in wiring a two-out-of-three logic function arrangement can short out the arrangement itself giving rise to a high probability of inadvertent monitoring system actuation. Moreover, there is a high probability of inadvertent monitoring system actuation while repairing or replacing a single sensor since connections to all sensors are generally exposed during the repair or replacement process.

In accordance with the present invention, a terminal board is provided for connecting a plurality of contact closures into a two-out-of-three logic function arrangement without the normally attendant dangers of connecting improper contact closures or inadvertent tripping of the monitoring arrangement. Moreover, the terminal board of the invention provides a simplified and short-circuit proof system in which repair or replacement of a sensor device is readily accomplished.

Accordingly, one object of the invention is to provide a prewired terminal board for interconnecting a plurality of contact closures into a two-out-of-three logic function arrangement.

Another object of the invention is to provide an improved two-out-of-three logic function terminal board which is shortcircuit proof when connecting contact closures associated with any one sensor device.

A further object of this invention is to provide an improved two-out-of-three logic function terminal board in which connecting a sensor device to the terminal board does not require great technical skill or knowledge of circuit diagrams.

A still further object of this invention is to provide an improved two-out-of-three logic function terminal board in which the monitoring system is operative even with one sensor completely disconnected from the terminal board.

In carrying out the objects of this invention, in one form thereof, there is provided a substantially rectangular terminal board for connecting a plurality of actuatable devices or contact closures into a two-out-of-three logic function arrangement. The terminal board includes an insulative base in which a plurality of parallel channels are formed. An electrical conductor is placed in each of the channels and is firmly attached to the base. Each of the conductors is provided with terminals for connecting a plurality of contact closures to the conductors. To implement the logic function, a plurality of busbar conductors are arranged transversely to and spaced above the conductors in the channels. Interconnection of the conductors in the channels is accomplished by screws attaching those conductors to the transverse busbar conductors at selected crossing points. In a specific form of the invention disclosed, the conductors are interconnected such that the two-out-of-three logic function can be implemented by attaching leads from a single sensor to conductors in adjacent channels, that is, the conductors are grouped such that the terminal board may be considered to be divided into sections with each section connected to a pair of contact closures actuated by a single sensor. Each of the sections of the terminal board is provided with a separate cover so that only that cover associated with the conductors to be attached to a single sensor need be removed at any one time. Grouping of the conductors under separate covers precludes the possibility of inadvertent tripping of the monitoring system by short-circuiting two or more sensors during repair or replacement of a single sensor.

The subject matter of the invention is particularly pointed out and distinctly claimed in the concluding portion of the specification. The invention, however, both as to organization and method of practice together with further objects and advantages thereof may best be understood by reference to the following description taken in connection with the accompanying drawings.

DESCRIPTION OF THE PREFERRED EMBODIMENT

For a better understanding of the invention, reference may be had to the accompanying drawings in which.

Figure 1:
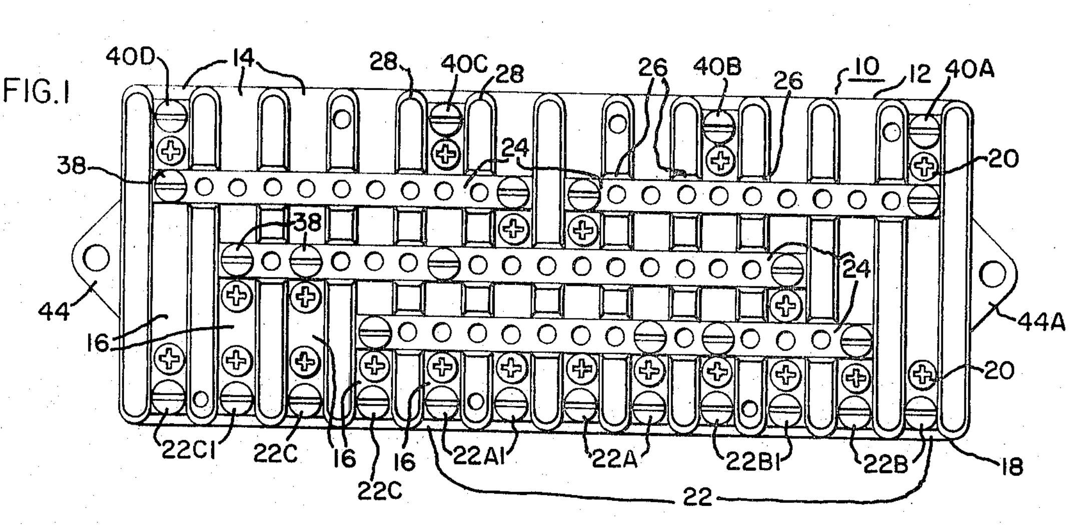
FIGS. 1 and 2 are top and elevation views respectively of the terminal board incorporating one embodiment of this invention and showing the arrangement of terminal strips and interconnection thereof.
Figure 2:
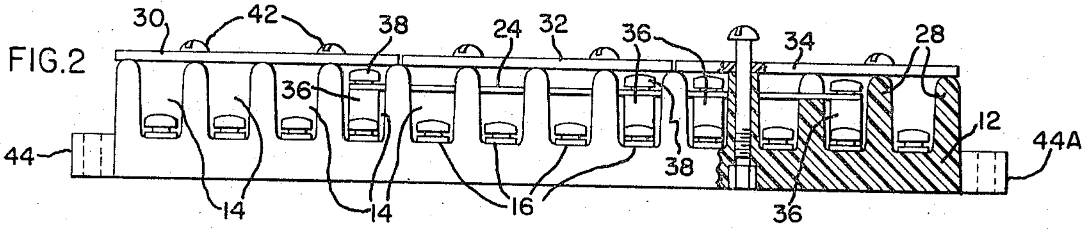

Referring to FIGS. 1 and 2 there is shown a substantially rectangular terminal board generally indicated at 10 comprising an insulative base 12 having a plurality of substantially parallel channels 14 in each of which is disposed a conducting strip 16. Each strip 16 has one end aligned with a front edge 18 of base 12 and is attached to base 12 by screws 20. A terminal means 22, such as, for example, a screw, is attached to each strip 16 at front edge 18 of base 12 for connecting a plurality of actuatable devices to the terminal board. The actuatable devices may, for example, be a set of relay contacts, hereinafter referred to as contact closures.

Connecting bus bars 24 are provided for interconnecting strips 16 in any desired arrangement. Bus bars 24 are arranged transversely to strips 16 and are disposed in slots 26 formed in dividers 28 separating the channels 14. Slots 26 are formed such that the bus bars 24 are disposed in a plane above the plane of the strips 16 yet below the plane of the top of the terminal board. Disposition of bus bars 24 in slots 26 prevents the bus bars 24 from interferring with placement of covers 30, 32, and 34 over the terminal board and further, since the plane of the slots is above the plane of the channels, provides insulative spacing between the bus bars 24 and strips 16.

To implement the two-out-of-three logic function, strips 16 are interconnected in a predetermined arrangement. Interconnection is accomplished by attaching strips 16 to bus bars 24 at selected points of intersection of the bus bars 24 with strips 16. At the selected points, a metallic spacer 36 is placed between a bus bar 24 and a strip 16 and a screw assembly 38 inserted to attach the bus bar 24 to the strip 16 and to maintain the spacer 36 in position. Spacer 36 and screw assembly 38 therefore provide mechanical connection and electrical continuity between bus bars 24 and strips 16 at desired points of contact.

Figure 3:
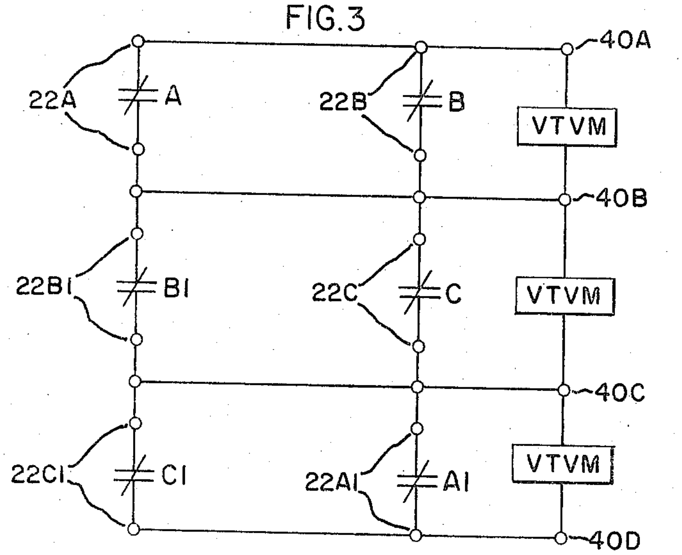
FIG. 3 is a schematic representation of a circuit employed with a terminal board incorporating one embodiment of this invention.

In order to provide readily accessible means for connecting meters or other monitoring instruments to the terminal board without the necessity of disturbing the terminal means 22 connecting the contact closures to the terminal board, additional terminal means 40A, 40B, 40C, and 40D are attached to selected ones of strips 16. In one embodiment these latter terminal means are attached to conductor strips 16 at the edge of the board opposite the front edge 18. To monitor the condition of contact closures connected to the terminal board, high impedance voltmeters (VTVM) may be connected between these terminal connections as is shown in FIG. 3. Terminals 40A and 40D may be used for connecting a power source to the terminal board and for connecting a device for sensing an alarm condition.

In the schematic representation of a two-out-of-three logic arrangement shown in FIG. 3, terminal means 22 include the pairs of terminals indicated as 22A, 22A1, 22B, 22B1, 22C, and 22C1. Contact closures to be connected to these terminal pairs are indicated by the numerals A and A1, B and B1, and C and C1 wherein the paired alpha numerals represent pairs of contact closures actuated by respective first, second, and third monitoring devices or sensors, not shown. Contact closures A and A1 are connected to respective pairs of terminals 22A and 22A1 shown in FIG. 1 and as schematically indicated in FIG. 3. Contact closure pairs B and B1 and C and C1 are similarly connected. Therefore, the terminal means 22 for connecting respective pairs of contact closures actuated by a single sensor are adjacent with each pair of terminal means 22 connected to opposing terminals of one contact closure. The terminal board can thus be considered to be composed of a plurality of interconnected sections, wherein each section is connected to the contact closures of a single sensor.

In one embodiment the terminal board comprises three sections and each section is provided with a separate cover. As is shown in FIG. 2 and as more clearly indicated in FIG. 4, the covers 30, 32, and 34 are each placed over a respective grouping of terminals to be connected to a pair of contact closures actuated by a single sensor. When connecting contact closures to terminal means 22, only that particular cover over the group of terminal means 22 to be connected to the contact closures actuated by a single sensor need be removed at any one time. If during the connecting process, the group of terminal means 22 uncovered is shortcircuited, no harm will follow since those terminal means are all connected to the contact closures actuated by a single sensor and the contact closures associated with the other sensors are physically and electrically isolated from the short circuit.

In operation, a power source may, for example, be connected to terminal 40A and a relay coil (not shown) may be connected between terminal 40D and a neutral return. Contact closures are connected to terminal means 22 as described above. Upon detection of a fault by the sensors associated with the contact closures and subsequent closing of the contact closures, a current path is established through the terminal board between terminals 40A and 40D. Consequently, power is supplied to the relay coil and causes its actuation to thereby indicate a system failure.

The particular interconnection of strips 16 shown in FIG. 1 allows disconnection of a pair of contact closures associated with a single sensor without inhibiting operation of the terminal board; however, as can be seen in FIG. 3, the logic function then becomes a two-out-of-two logic rather than a two-out-of-three logic since both of the remaining operative sensors must actuate their repective contact closures in order to trip the monitoring system. For example, if the sensor which actuates contact closures A and A1 is inoperative, or disconnected, both of the two remaining sensors must actuate their respective contact closures, that is, contact closures B and B1 and C and C1, in order to provide a current path between terminal 40A and 40D of the terminal board.

Figure 4:
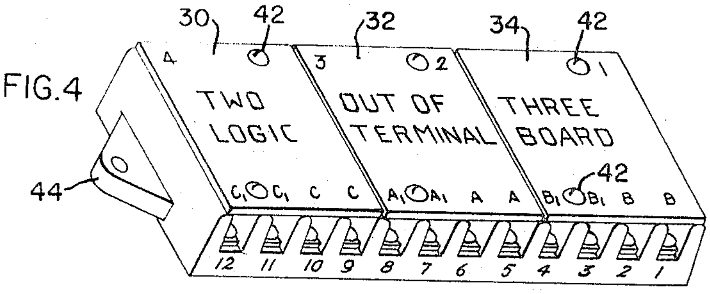
FIG. 4 is a perspective view of an embodiment of the terminal board.

An embodiment of an assembled terminal board is shown in perspective view in FIG. 4. Covers 30, 32, and 34 associated with the three defined sections of the board are held in place by screws 42. Flanges 44 and 44A on opposite ends of the base 12 are provided to allow for attachment of the terminal board to a surface, although other means well known in the art may be provided for this purpose.

It will thus be seen that the objects set forth above are efficiently attained and since certain changes may be made in the above constructions without departing from the scope of the invention, it is intended that all matter contained in the above description or shown in the accompanying drawings shall be interpreted as illustrative and not in a limiting sense.

What is claimed as new and desired to be secured by Letters Patent of the United States is:

1. A terminal board for connecting first, second and third pairs of actuatable devices controlled respectively by first, second, and third monitoring devices into a two-out-of-three logic arrangement to apply power to an external load when at least two of said pairs of said actuatable devices are actuated comprising:

an electrically insulated base including first, second, and third sections, each of said sections having a plurality of substantially parallel channels formed therein, the sides of said channels forming insulative dividers;

a plurality of conducting strips, said strips being disposed one in each of said channels, each of said strips including at least one connecting terminal;

a plurality of bus bars arranged transversely to said conducting strips and disposed in slots formed in said dividers, wherein said bus bars are located in a plane spaced above said strips and spaced below the plane defined by the tips of the dividers formed by said channels; and means for attaching said bus bars to said strips at selected points for interconnecting specified ones of said strips to effect a two-out-of-three logic arrangement of said actuatable devices.

2. A terminal board as defined in claim 1, wherein said conducting strips are grouped in three sets, each of said sets being mounted respectively on a different one of said sections of said base, each of said sets including only those conducting strips to be connected to a pair of actuatable devices which are actuated by a single monitoring device.

3. A terminal board as defined in claim 2, wherein each of said sets of conducting strips is provided with a separate insulative cover.

4. A terminal board as defined in claim 3, wherein each of said sets includes four conducting strips arranged in adjacent pairs, each of said pairs of strips being connected to opposing terminals of one actuatable device.

5. A terminal board for connecting first, second and third pairs of actuatable devices controlled by first, second, and third monitoring devices, respectively, in a two-out-of-three logic arrangement comprising:

an insulative base having a plurality of channels, each channel having a conductor disposed therein and each conductor having a terminal at least at one end; and, each actuatable device interconnecting a pair of conductors at the terminal ends thereof;

an insulative cover associated with each monitoring device and each pair of actuatable devices thereby dividing the terminal board into first, second and third sections, respectively; the covers overlying the conductors and removably attached to the insulative base whereby the first monitoring device and first pair of actuatable devices may be connected to the terminal board by removing only the first section cover; the second monitoring device and second pair of actuatable devices may be connected to the terminal board by removing only the second section cover; and, the third monitoring device and third pair of actuatable devices may be connected to the terminal board by removing only the third section cover; and, a plurality of bus bars sandwiched between the insulative covers and base interconnecting selected conductors to effect the two-out-of-three logic arrangement.

* * * * *